United States Patent [19]

Lemmon

[11] 4,317,596
[45] Mar. 2, 1982

[54] ADJUSTABLE WHEEL ASSEMBLY

[75] Inventor: Norman F. Lemmon, Cedar Falls, Iowa

[73] Assignee: Deere & Company, Moline, Ill.

[21] Appl. No.: 151,721

[22] Filed: May 20, 1980

[51] Int. Cl.³ .............................................. B60B 37/00
[52] U.S. Cl. ......................................... 301/1; 301/111; 301/128; 403/16; 403/369; 403/370; 403/374
[58] Field of Search ................... 301/1, 111, 126, 128; 403/369–371, 374, 16; 295/43

[56] References Cited

U.S. PATENT DOCUMENTS

| | | | |
|---|---|---|---|
| 2,676,849 | 4/1954 | Houck et al. | 301/1 |
| 3,279,831 | 10/1966 | Smelcer et al. | 301/1 X |
| 3,957,381 | 5/1976 | Schafer | 403/374 X |

FOREIGN PATENT DOCUMENTS 2529379  1/1977  Fed. Rep. of Germany .......... 301/1

Primary Examiner—Charles A. Marmor

[57] ABSTRACT

An adjustable wheel assembly which facilitates the positioning of a wheel on an axle. The wheel assembly includes an elongated axle having a rack and a keyway, a wheel hub, and two pairs of arc-shaped wedges positioned between the axle and the wheel hub. Two of the four arc-shaped wedges are inserted into a tapered bore on one side of the wheel hub and the remaining two wedges are inserted into a second tapered bore on the opposite side of the wheel hub. Each of the four arc-shaped wedges further contains a radial flange with bolt holes therethrough so that each wedge can be bolted to the wheel hub. In addition, one of the wedges contains a radial opening housing pinion gear which meshes with the rack on the axle so as to axially move the wheel hub along the axle. The wheel assembly also contains a pair of jackscrews which are used to force two of the oppositely aligned wedges axially apart thereby allowing the wheel hub to be released from the axle.

14 Claims, 4 Drawing Figures

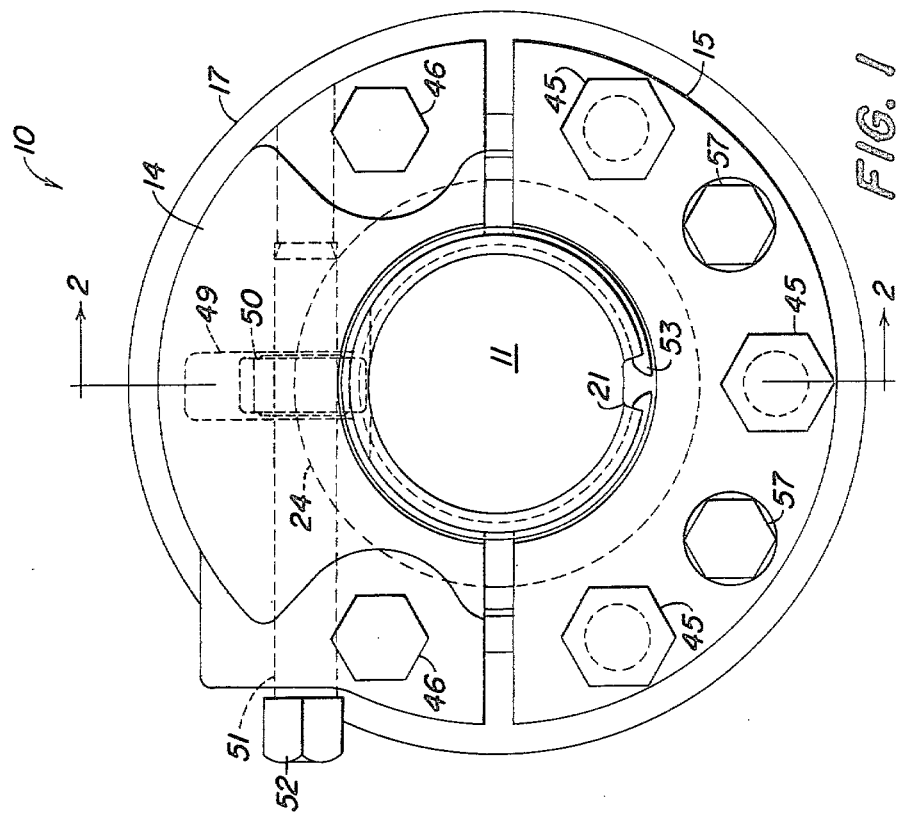
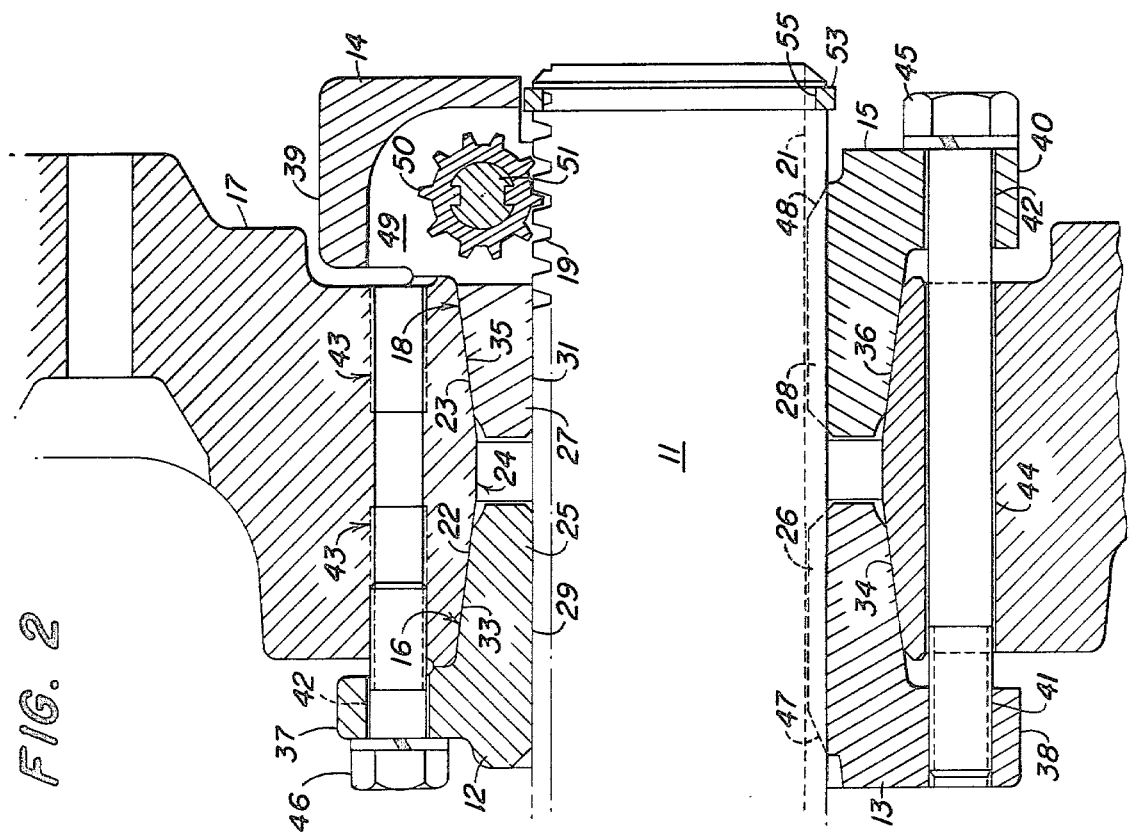

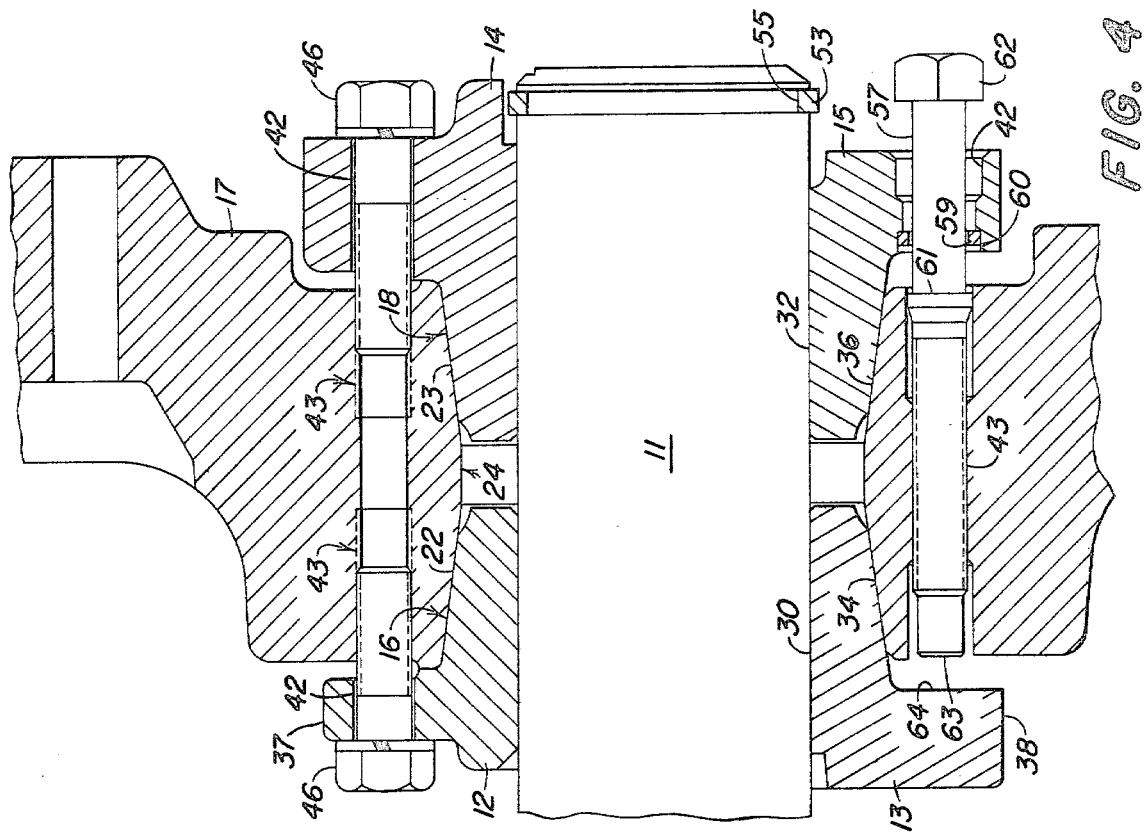
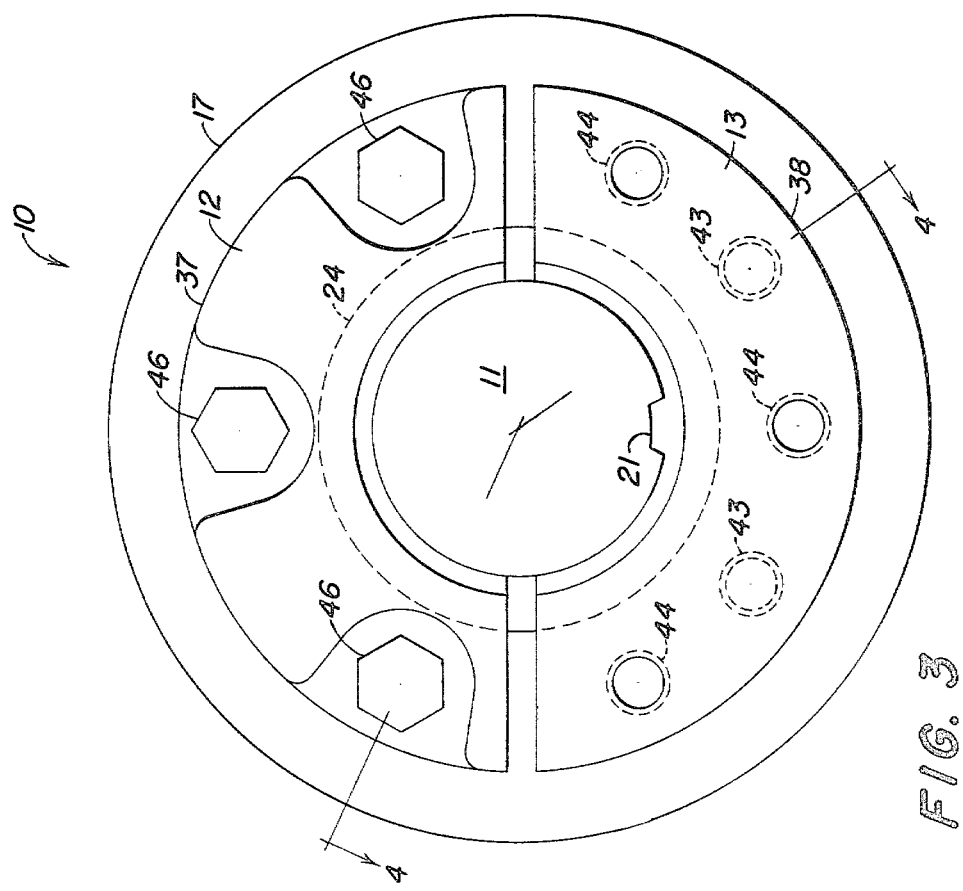

ADJUSTABLE WHEEL ASSEMBLY

BACKGROUND OF THE INVENTION

1. Field of the Invention

This invention relates to an adjustable wheel assembly and more particularly to an adjustable wheel assembly for an agricultural tractor.

2. Description of the Prior Art

One of the necessary features on an agricultural tractor is the ability for the operator to adjust the wheel spacing so as to perform various farm operations. Typically, the drive wheels on a tractor are adjusted to match a particular farming operation. For example, when plowing, it is advantageous to keep the line of draft of the implement in alignment with the center line of the tractor and still have one wheel of the tractor run in the furrow formed by the plow on the previous pass. When cultivating, it is necessary to have the wheels properly spaced to run between the rows of crop. As the operator changes from one type of operation or implement to another, he must adjust the wheel spacing to suit the new function or implement.

Since the wheels of a tractor are quite heavy, particularly when loaded with wheel weights or filled with a liquid solution for weighting purposes, it is advantageous that the tractor contain an easily adjustable wheel assembly. This wheel assembly should be functional even when a tractor's axle and associated wheel attaching components are coated with an accumulation of rust and mud. Most of the currently available wheel assemblies are constructed in such a way that it is extremely difficult for the operator to release the wheel hub from the axle under these conditions. In fact, the buildup of rust and mud on the wheel hub can require high wrench torque forces to break the bolts loose before adjustment of the wheel on the axle can be made.

Previous attempts to rectify such wheel adjustment problems have led to a variety of mechanisms. Two of these mechanisms are described in the following U.S. Pat. Nos. 2,676,849, issued in April 1954 to G. H. Houck et al and 3,279,831, issued in October 1966 to G. E. Smelcer et al. The first of these two patents, the Houck patent, teaches a wheel assembly using two tapered semicircular wedge-like structures which are inserted about the axle and are bolted to the wheel hub. Such a design is both difficult to manufacture because of the length of the two tapered wedges and often is hard to disassemble since the two long tapered wedges have more surface area on which to rust onto the wheel hub. Applicant's new invention minimizes the manufacturing problems and overcomes the buildup of rust by using a plurality of shorter arc-shaped wedges containing a smaller taper length. By shortening the length of the taper, closer manufacturing tolerances can be obtained which reduce the presence of air pockets and thereby minimize rust buildup.

The Smelcer patent teaches another method of mounting a tractor wheel to an axle. This particular method uses recesses formed in both the axle and the wheel hub which together contain multiple drive transmitting means. The drive transmitting means include elongated key members disposed in the recesses so that the wheel hub will turn with the axle. The Smelcer patent, aside from using axle recesses and elongated key members, is further distinguishable from applicant's invention is that no mechanism is taught for moving the wheel hub axially along the axle after the fastening bolts are loosened. Instead, Smelcer relies on a rocking motion to move the wheel along the axle.

The above two assemblies, along with the other wheel assemblies, have not been altogether satisfactory either because of their inability to be adjusted under field conditions or because functionally they are not adaptable to farming operations. These disadvantages are overcome by the present invention.

The general object of this invention is to provide an adjustable wheel assembly for an agricultural tractor. A more specific object of this invention is to provide an adjustable wheel assembly with easy adjustability without requiring high wrench torque forces.

Another object of this invention is to provide an adjustable wheel assembly which uses a greater contact area between the wheel hub and the axle, thereby improving adjustability.

Still another object of this invention is to provide an adjustable wheel assembly having two pairs of arc-shaped wedges which provide a more controllable contact surface for the outer edges of the wheel hub while being less sensitive to tolerance variations.

A further object of this invention is to provide an adjustable wheel assembly which is reversible so that two wheels can be placed side by side on a single axle.

Still further, an object of this invention is to position an adjusting means in one of the arc-shaped wedges so that one size wheel hub can fit various size axles.

Other objects and advantages of the present invention will become more apparent when considered in connection with the specification and the drawings.

SUMMARY OF THE INVENTION

Briefly, this invention relates to an adjustable wheel assembly which facilitates adjusting the wheels on a tractor. This adjustable wheel assembly is comprised of an elongated axle having a rack and a keyway, a wheel hub, and two pairs of arc-shaped wedges positioned between the axle and the wheel hub. The elongated axle is constructed with the rack and the keyway positioned along a lengthwise portion of the axle's periphery. The two pairs of arc-shaped wedges are positioned concentric about this axle and are housed in two tapered bores located in the central portion of the wheel hub. Two of the four wedges are inserted on one side of the wheel hub and the remaining two wedges are inserted from the opposite side. The semicircular, arc-shaped configuration of the wedges permits them to slide upon the axle and also to conform to the two tapered bores in the wheel hub. Each of the four wedges also contains a radial flange provided with bolt holes which are positionable adjacent to a side portion of the wheel hub and are attached thereto. Two of the arc-shaped wedges also contain a key which meshes with the keyway in the axle to prevent the wheel hub from slipping circumferentially on the axle.

In order to move the wheel hub axially along the axle, an adjusting means is used which meshes with the rack in the axle. This adjusting means is mounted in a radial opening in one of the arc-shaped wedges and extends through the wedge so as to mesh with the rack. With the clamping forces relieved, the adjusting means is rotated by an actuating means so as to adjust the position of the wheel hub along the axis of the axle. The four arc-shaped wedges are then bolted in place and the tractor is ready for use.

To reposition the wheel, the operator first releases the clamping forces by loosening the bolts. He then actuates a pair of jackscrews which axially separate two of the four wedges, the two wedges being oppositely aligned. This action allows the wheel hub to be adjusted on the axle by means of the adjusting means. After repositioning the wheel hub, the bolts are tightened and the tractor is ready for use. The use of the four tapered, arc-shaped wedges in conjunction with a pair of jackscrews facilitates the disassembly procedure which currently is a major problem with conventional designs.

BRIEF DESCRIPTION OF THE DRAWINGS

FIG. 1 shows the adjustable tractor wheel assembly as viewed looking at the tractor from the side.

FIG. 2 is a sectional view of FIG. 1 as seen along the line 2—2.

FIG. 3 shows the opposite side of the adjustable tractor wheel assembly as viewed in FIG. 1.

FIG. 4 is a sectional view of FIG. 3 as seen along the line 4—4.

DETAILED DESCRIPTION OF THE INVENTION

FIG. 1 shows an adjustable wheel assembly 10 designed for use on agricultural tractors. This adjustable wheel assembly 10 comprises an elongated axle 11 surrounded by four tapered, arc-shaped wedges 12, 13, 14, and 15 (see FIG. 2) and a wheel hub 17.

Referring now to FIG. 2, the elongated axle 11 contains a rack 19 and a keyway 21, both of which are constructed along a lengthwise portion of the periphery of the axle 11. Preferably, the rack 19 is formed of axially spaced gear teeth which are situated along a substantial portion of the elongated axle 11. The keyway 21 is also situated along a substantial portion of the elongated axle 11 and is spaced apart from the rack 19. Preferably, the keyway 21 is located opposite the rack 19. The specific configuration of the keyway 21 is not crucial so long as it is not overly large as to render the axle 11 ineffective.

The wheel hub 17 contains two oppositely aligned bores 16 and 18 having equal angular tapered interior surfaces 22 and 23, respectively. The wheel hub 17 is designed to be slipped over the axle 11 and therefore, the interior diameter of the bores 16 and 18 should be larger than the outer diameter of the axle 11. In addition, the two bores 16 and 18 can be alternatively constructed so that the two tapered interior surfaces 22 and 23 either come together or are separated by a non-tapered bore 24 as shown in FIGS. 2 and 4.

The wheel hub 17 is positioned about the axle 11 and the four arc-shaped wedges 12, 13, 14 and 15 are positioned therebetween. Each of the four arc-shaped wedges 12, 13, 14 and 15, has an axial semicircular portion 25, 26, 27 and 28, respectively. Each semicircular portion 25, 26, 27 and 28 has an inner cylindrical surface 29, 30, 31 and 32, respectively, and an outer annular tapered surface 33, 34, 35 and 36, respectively, formed about the axis of each respective inner cylindrical surface 29, 30, 31 and 32. Furthermore, each of the four arc-shaped wedges 12, 13, 14 and 15 has a radial flange 37, 38, 39 and 40 at the large end of the tapered surfaces 33, 34, 35 and 36, respectively.

Each of the radial flanges 37, 38, 39 and 40 include at least two threaded and/or non-threaded holes 41 and 42, respectively. These holes 41 and 42 are arranged in a circular arc outside of the tapered surfaces 33, 34, 35 and 36, respectively. The threaded and non-threaded holes 41 and 42, respectively, preferably bolt holes, are aligned adjacent to other threaded and non-threaded holes 43 and 44, respectively, located in the wheel hub 17.

The wedges 12, 13, 14 and 15 are held in position between the axle 11 and the wheel hub 17 by a plurality of lower and upper fastening means 45 and 46, respectively, which pass through or are inserted into the holes 41, 42, 43 and 44. The lower fastening means 45 pull the two arc-shaped wedges 13 and 15 together. This action forces the wedges 13 and 15 between the axle 11 and the two tapered interior surfaces 22 and 23, respectively. The upper fastening means 46 secure the two wedges 12 and 14 to the wheel hub 17. The use of the terms "lower" and "upper" are solely for the purpose of describing the particular arrangement as depicted in the drawings. The position of the fastening means 45 and 46 will change as the wheel hub 17 is rotated on the axle 11.

The inner cylindrical surfaces 30 and 32 of the two arc-shaped wedges 13 and 15, respectively, (see FIG. 4) also contain keys 47 and 48, respectively, (best seen in FIG. 2) which cooperate with the keyway 21 in the axle 11. The interaction of the keys 47 and 48 in the keyway 21 insures that the wheel hub 17 will not rotatably slip on the axle 11. This assures that a driving torque can be applied to the wheel hub 17.

The arc-shaped wedge 14, which is depicted as the upper right-hand wedge in FIG. 2, is different from the other three wedges in that it contains a radial opening 49 which is exposed to the rack 19. Within this opening 49 is positioned an adjusting means 50 which is mounted on and rotatably keyed to a connectable actuating means 51, such as a rotatable outward extending shaft. The adjusting means 50, which is depicted as a pinion gear, projects through the opening 49 and meshes with the teeth on the rack 19 for moving the wheel hub 17 axially along the axle 11 when the clamping pressure is relieved. It should be noted that although a rack and a pinion gear are taught as the means for adjusting the wheel hub 17 on the axle 11, other combinations, such as a pivoted lever and a rack, a worm and a rack, a pinch bar and a rack, or various other mechanisms known to those skilled in the art to accomplish such movement, can be used.

By placing the adjusting means 50 in one of the arc-shaped wedges instead of in the wheel hub 17, applicant has assured that one standard size wheel hub will fit over any size axle. This feature reduces the manufacturing cost for wheel hubs and increases the operator's ability of using certain wheels on any of his tractors.

The rotatable actuating means 51 extends outward from the arc-shaped wedge 14 and is accessible to the operator so that the adjusting means 50 can be easily rotated. This rotatable actuating means 51, as shown in FIG. 1, is a cylindrical shaft with a hexagonal head portion 52 so that conventional wrenches can be used for making adjustment.

To insure that the wheel hub 17 is not unintentionally moved off of the end of the axle 11, a snap ring 53 is positioned in a groove 55 located in the outer periphery of the axle 11. This snap ring 53 can be removed, if desired, such as when the operator wishes to remove the wheel hub 17 from the axle 11.

The removal or adjustment of the wheel hub 17 from or on the axle 11 is accomplished by first loosening the lower fastening means 45 (as shown in FIG. 2). Referring now to FIG. 4, a pair of jackscrews 57 positioned through the holes 42 and 43 in the wedge 15 and in the wheel hub 17, respectively, are then selectively rotated. As shown, the jackscrews 57 are held secured to the wedge 15 by a snap ring 59 which is partially compressed into a groove 60. This snap ring 59 will prevent an enlarged shoulder 61, located on the jackscrew 57, from passing through the wedge 15. Thus, the two jackscrews 57 will remain attached to the wedge 15, even when the wedge 15 is removed from the wheel hub 17.

Each jackscrew 57 contains a head 62, a bottom surface 63 and the enlarged shoulder 61. The head 62 is designed to be turned by a wrench so as to move the jackscrew 57 either in or out of the wheel hub 17. When each of the two jackscrews 57 are threaded inward into the wheel hub 17, the bottom surface 63 will abut an imperforated surface 64 on the oppositely aligned wedge 13 and thereafter axially force the wedge 13 away from the wheel hub 17. This action will overcome any contact pressure which may be present between the wheel hub 17 and the tapered outer surface 34 of the wedge 13. The presence of rust or dirt on the wedge 13 and/or on the wheel hub 17 will not materially hinder the removal process since the force exerted by the two jackscrews 57 will be sufficient to overcome any such resistance. Once the wedge 13 has been freed, the two jackscrews 57 are rotated in the opposite direction so as to back out of the wheel hub 17. This action causes the enlarged shoulder 61, which is located approximately at the middle of each of the two jackscrews 57, to abut against the snap ring 59 located in the wedge 15. This action forces the tapered surface 36 of the wedge 15 away from the wheel hub 17.

Adjustment or removal of the wheel hub 17 on the axle 11 can be made without completely removing the two wedges 13 and 15 from the bores 16 and 18. As long as the wedges 13 and 15 are backed off a reasonable amount, adjustment is possible. Once the wheel hub 17 has been moved to the new desired position, the two jackscrews 57 are positioned so as not to interfere with the wedges 13 and 15, and the lower fastening means 45 are again tightened.

It should be noted that each of the four arc-shaped wedges 12, 13, 14 and 15 can be installed into the wheel hub 17 from the side opposite that shown in FIGS. 2 and 4. This provides access to the adjusting means 50, the lower and upper fastening means 45 and 46, and the two jackscrews 57 from the opposite side of the wheel hub 17. This versatility is important for it allows the operator to position these items 12, 13, 14, 15, 45, 46 and 57 for easiest access when it is necessary to reverse the orientation of the wheel on the axle 11. It also permits the operator to place two wheels side by side on an axle, as may be the case when dual wheels are used.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:
1. An adjustable wheel assembly comprising:
   (a) an elongated axle having a rack and a keyway both constructed along a lengthwise portion of the periphery of said axle, said rack spaced apart from said keyway and formed of axially spaced gear teeth;
   (b) two pairs of arc-shaped wedges surrounding said axle, each wedge having an axial semicircular portion with an inner cylindrical surface axially slidable upon said axle and an outer annular tapered portion formed about the axis of said inner cylindrical surface, each of said wedges further having a radial flange at the large end of said taper, each of said radial flanges containing a plurality of holes arranged in a circular arc outside of said respective tapered portion, one of said wedges having a radial opening therein exposing said rack to the interior of said wedge, and two other of said wedges having keys cooperative with said axle keyway for forcing simultaneous rotation of said two key containing wedges and said axle;
   (c) a wheel hub concentric with said axle and said two pairs of arc-shaped wedges, said wheel hub having two oppositely aligned tapered bores complimenting and fitting said outer annular tapered portion of each of said wedges, said wheel hub further having radial portions containing complementary holes positionable adjacent to said radial flanges, certain of said wheel hub holes aligned with said holes in said radial flanges and certain other of said wheel hub holes aligned against imperforated surfaces on said radial flange of one of said key containing wedges;
   (d) a plurality of fastening means for forcing said two key containing wedges between said wheel hub and said axle and for clamping said other two wedges to said wheel hub;
   (e) a pair of jackscrews selectively receivable through two of said holes in one of said key containing wedges and threaded into two of said wheel hub holes to engage with two of said imperforated surfaces on said other key containing wedge, said pair of jackscrews capable of forcing said wheel hub and said two key containing wedges axially apart; and
   (f) adjusting means rotatably mounted in said wedge having said radial opening, said adjusting means projecting through said radial opening and meshing with said rack.
2. The wheel assembly of claim 1 wherein each of said arc-shaped wedges is approximately semicircular in shape.
3. The wheel assembly of claim 1 wherein said tapered bores of said wheel hub are inclined inward to a smaller diameter approximate the middle of said wheel hub.
4. The wheel assembly of claim 1 wherein said axle contains a snap ring attached about the periphery of the outer end.
5. An adjustable wheel assembly comprising:
   (a) an elongated axle having a rack and a keyway both constructed along a lengthwise portion of the periphery of said axle, said rack spaced apart from said keyway and formed of axially spaced gear teeth;
   (b) two parts of arc-shaped wedges surrounding said axle, each wedge having an axial semicircular portion with an inner cylindrical surface axially slidable upon said axle and an outer annular tapered portion formed about the axis of said inner cylindrical surface, each of said wedges further having a radial flange at the large end of said taper, each of said radial flanges containing a plurality of holes arranged in a circular arc outside of said respective tapered portion, one of said wedges having a radial opening therein exposing said rack to the interior of said wedge, and two other of said wedges having keys cooperative with said axle keyway for forcing simultaneous rotation of said two key containing wedges and said axle;

(c) a wheel hub concentric with said axle and said two pairs of arc-shaped wedges, said wheel hub having two oppositely aligned tapered bores complimenting and fitting said outer annular tapered portion of each of said wedges, said wheel hub further having radial portions containing complementary holes positionable adjacent to said radial flanges, certain of said wheel hub holes aligned with said holes in said radial flanges and certain other of said wheel hub holes aligned against imperforated surfaces on said radial flange of one of said key containing wedges;

(d) a plurality of fastening means for forcing said two key containing wedges between said wheel hub and said axle and for clamping said other two arc-shaped wedges to said wheel hub;

(e) a pair of jackscrews selectively receivable through two of said holes in one of said key containing wedges and threaded into two of said wheel hub holes to engage with two of said imperforated surfaces on said other key containing wedge, said pair of jackscrews capable of forcing said wheel hub and said two key containing wedges axially apart;

(f) adjusting means rotatably mounted in said wedge having said radial opening, said adjusting means projecting through said radial opening and meshing with said rack; and (g) actuating means connectable to said adjusting means for axially moving said wheel hub along said axle.

6. The wheel assembly of claim 5 wherein each of said arc-shaped wedges is approximately semicircular in shape.

7. The wheel assembly of claim 5 wherein said tapered bores of said wheel hub are inclined inward to a smaller diameter approximate the middle of said wheel hub.

8. The wheel assembly of claim 5 wherein said adjusting means is a pinion gear.

9. The wheel assembly of claim 5 wherein said actuating means is a cylindrical shaft.

10. An adjustable wheel assembly comprising:
(a) an elongated axle having a rack and a keyway both constructed along a lengthwise portion of the periphery of said axle, said rack spaced apart from said keyway and formed of axially spaced gear teeth;
(b) two pairs of arc-shaped wedges surrounding said axle, each wedge having an axial semicircular portion with an inner cylindrical surface axially slidable upon said axle and an outer annular tapered portion formed about the axis of said inner cylindrical surface, each of said wedges further having a radial flange at the large end of said taper, each of said radial flanges containing a plurality of holes arranged in a circular arc outside of said respective tapered portion, one of said wedges having a radial opening therein exposing said rack to the interior of said wedge, and two other of said wedges having keys cooperative with said axle keyway for forcing simultaneous rotation of said two key containing wedges and said axle;

(c) a wheel hub concentric with said axle and said two pairs of arc-shaped wedges, said wheel hub having two oppositely aligned tapered bores complimenting and fitting said outer annular tapered portion of each of said wedges, said wheel hub further having radial portions containing complementary holes positionable adjacent to said radial flanges, certain of said wheel hub holes aligned with said holes in said radial flanges and certain other of said wheel hub holes aligned against imperforated surfaces on said radial flange of one of said key containing wedges;

(d) a plurality of fastening means for forcing said two key containing wedges between said wheel hub and said axle and for clamping said other two arc-shaped wedges to said wheel hub;

(e) a pair of jackscrews selectively receivable through two of said holes in one of said key containing wedges and threaded into two of said wheel hub holes to engage with two of said imperforated surfaces on said other key containing wedge, said pair of jackscrews capable of forcing said wheel hub and said two key containing wedges axially apart;

(f) a pinion gear rotatably mounted in said wedge having said radial opening, said pinion gear projecting through said radial opening and meshing with said rack; and (g) actuating means connectable to said pinion gear for rotating said pinion gear on said rack to axially move said wheel hub along said axle.

11. The wheel assembly of claim 10 wherein each of said arc-shaped wedges is approximately semicircular in shape.

12. The wheel assembly of claim 10 wherein said tapered bores of said wheel hub are inclined inward to a smaller diameter approximate the middle of said wheel hub.

13. The wheel assembly of claim 10 wherein said axle contains a snap ring attached about the periphery of the outer end.

14. An adjustable wheel assembly comprising:
(a) an elongated axle having a rack and a keyway, both of which are constructed along a lengthwise portion of the periphery of said axle, said rack spaced apart from said keyway, and formed of axially spaced gear teeth;
(b) four arc-shaped wedges surrounding said axle, each of said wedges having an axial semicircular portion with an inner cylindrical surface axially slidable upon said axle and an outer annular tapered portion formed about the axis of said inner cylindrical surface, each of said wedges further having a radial flange at the large end of said taper, each of said radial flanges containing a plurality of bolt holes arranged in a circular arc outside of said tapered portion, certain of said bolt holes being threaded, one of said wedges having a radial opening therein exposing said rack to the interior of said wedge, and two other of said four wedges having a key cooperative with said keyway in said axle for causing unified rotation of said wedges and said axle;
(c) a wheel hub encircling said axle and said four arc-shaped wedges, said wheel hub having two oppositely aligned tapered bores inclined inward to a smaller diameter approximate the middle of said wheel hub, said two tapered bores complementing and fitting said outer annular tapered portion of each of said four wedges, said wheel hub further having radial portions containing complementary bolt holes positionable adjacent to said radial flanges of said four wedges, certain of said bolt holes aligned with said threaded bolt holes in said wedges and certain of said bolt holes aligned against imperforated surfaces on said radial flange of one of said key containing wedges;

(d) a plurality of bolt means selectively receivable in said bolt holes of said wedges and said wheel hub for axially forcing said two key containing wedges between said wheel hub and said axle and for clamping said other two wedges to said wheel hub;

(e) a pair of jackscrews selectively receivable through two of said unthreaded bolt holes in said two key containing wedges and threaded into two of said bolt holes in said wheel hub, said pair of jackscrews engageable with two of said imperforated surfaces located on said radial flange of said other key containing wedge, said pair of jackscrews capable of forcing said wheel hub and said two key containing wedges axially apart;

(f) a pinion gear rotatably mounted in said wedge having said radial opening, said pinion gear projecting through said radial opening and meshing with said rack; and (g) a cylindrical shaft with a hexagonal head connected to said pinion gear for rotating said pinion gear on said rack to axially move said wheel hub along said axle when no clamping pressure is present.

* * * * *